United States Patent [19]
Grimes et al.

[11] 3,869,279
[45] Mar. 4, 1975

[54] ACCELERATOR PEDAL ASSEMBLY

[75] Inventors: Delmar C. Grimes, Flint; Raymond Stocker, Bloomfield, both of Mich.

[73] Assignee: Ford Motor Company, Dearborn, Mich.

[22] Filed: Jan. 4, 1974

[21] Appl. No.: 430,821

[52] U.S. Cl................. 74/513, 74/512, 74/560
[51] Int. Cl............................................... G05g 1/14
[58] Field of Search ............ 74/512, 513, 560, 561, 74/539, 478, 481, 482

[56] References Cited
UNITED STATES PATENTS
3,631,739   1/1972   McArthur..................... 74/560 X

*Primary Examiner*—Samuel Scott
*Assistant Examiner*—Frank H. McKenzie, Jr.
*Attorney, Agent, or Firm*—Roger E. Erickson; Keith L. Zerschling

[57] ABSTRACT

An accelerator pedal assembly for an automotive vehicle having a pedal pad which is pivotable about a horizontal axis to accommodate the angular position of the operator's foot and in which pivotal movement of the pedal pad can be used to effect throttle opening. The pedal assembly includes a pair of levers mounted to the vehicle body to pivot about a second horizontal axis. The first of the levers is pivotally connected to the pedal pad. The second of the levers at its lower end slidingly engages the back side of the pedal pad at a position spaced from its pivotal connection. The upper end of the second of the levers is connected to a throttle actuating cable or a linkage.

7 Claims, 3 Drawing Figures

PATENTED MAR 4 1975
3,869,279
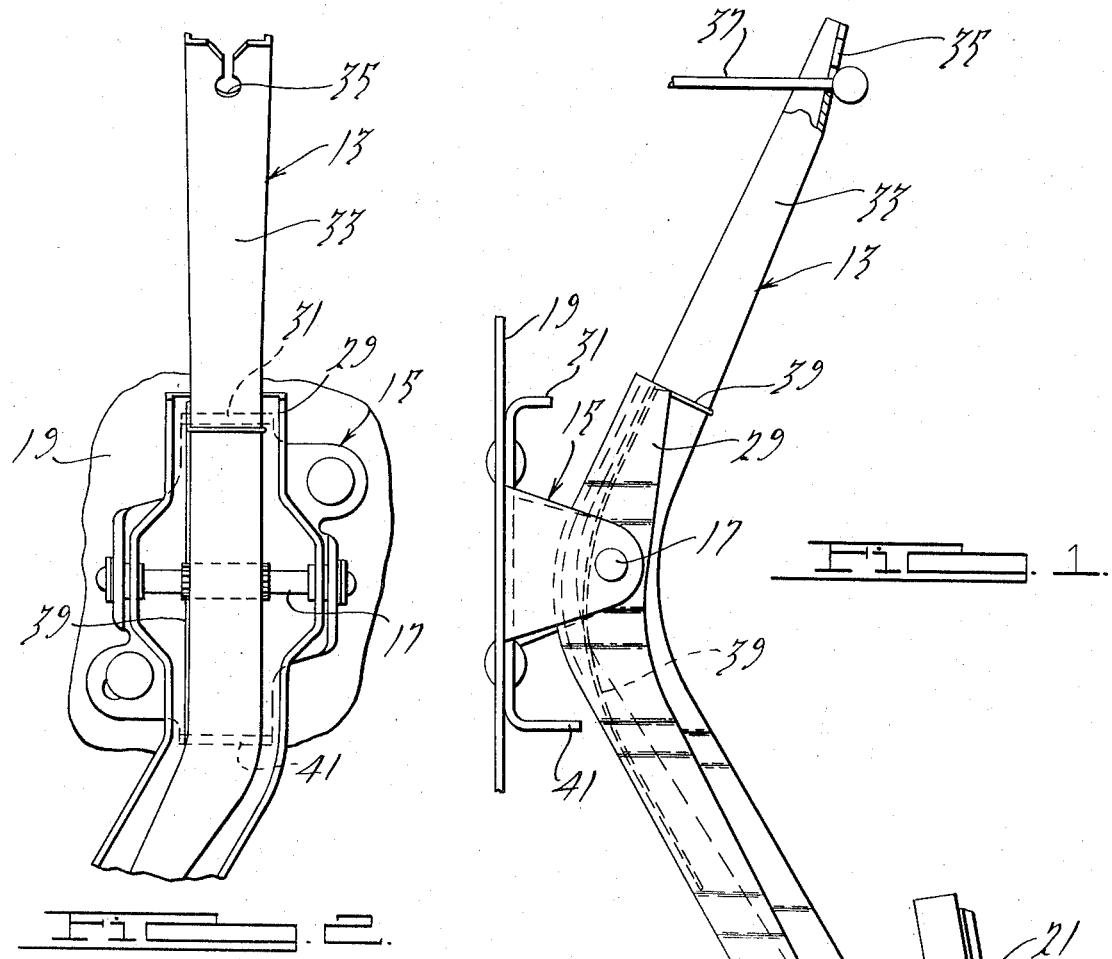
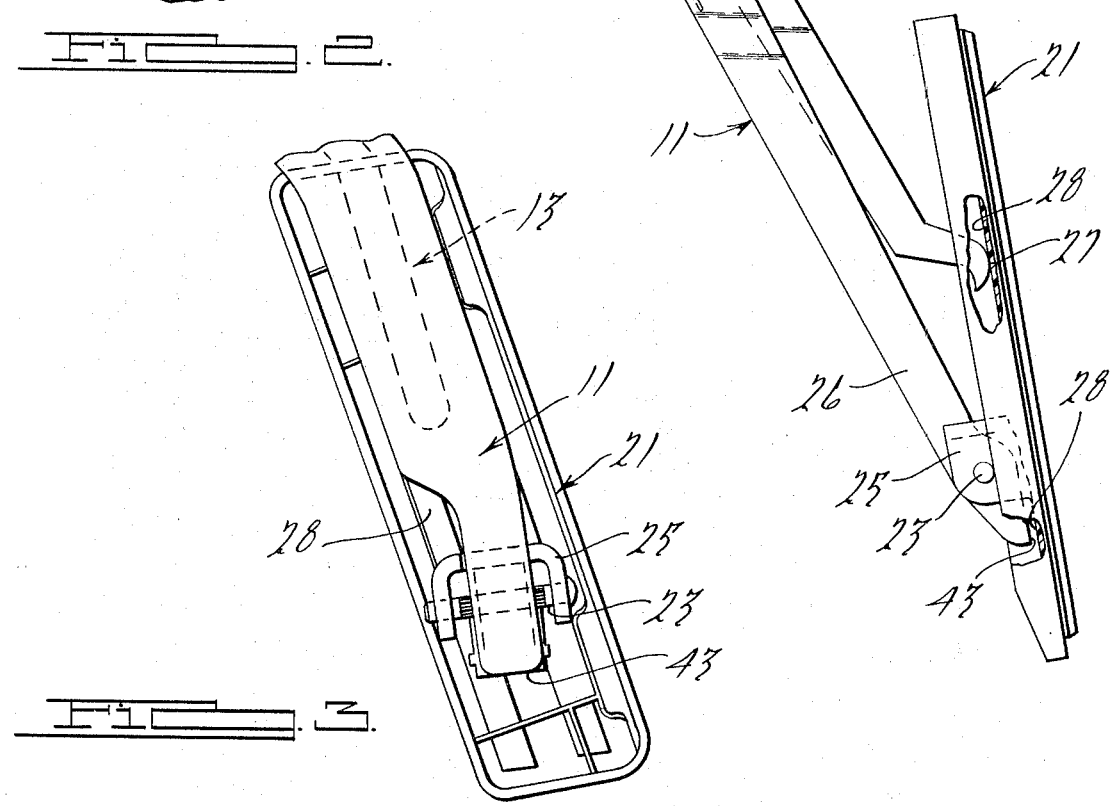

ACCELERATOR PEDAL ASSEMBLY

BACKGROUND AND SUMMARY OF THE INVENTION

When depending control pedals for automobiles first came into common use, the pedal pads were generally fixed relative to the depending levers. As a means to increase driving comfort, accelerator pedal pads which pivoted about a horizontal axis were introduced and provided automatic positioning of the pad in positions substantially parallel with the sole of the vehicle operator's shoe. Such pedal pads were usually spring biased into an extreme rearward positon and the engagement of the vehicle operator's show with the pedal pad front surface would cause the pad to pivot forwardly until it was essentially flat against the bottom of the operator's shoe. Simple pivotal movement of the pedal pad relative to the lever on which it was mounted did not result in displacement of the accelerator linkage. In some situations, particularly when the vehicle operator engaged the extreme upper portion of the pedal pad with his foot, initial movement of the pedal pad resulted in no actuation of the accelerator lever until the pad had moved through the entire range of pivotable movement.

This invention provides an accelerator pedal assembly in which the pedal pad is pivotally mounted to a lever member to accommodate the angle or position of the vehicle operator's foot but which a simple forward pivotal movement of the pedal pad relative to the lever provides an opening input to the throttle linkage. This invention further provides an accelerator pedal assembly that is adjustable to the operator's foot and yet retains a firm feeling to the vehicle operator during the entire range of of accelerator pedal travel. Finally, this invention provides an adjustable accelerator pedal assembly which is economical to produce and reliable in operation.

An accelerator pedal assembly constructed in accordance with this invention includes a pair of levers mounted to the body of the automotive vehicle to pivot about a common horizontal axis. A pedal pad is pivotally attached to the end of one of the levers while the corresponding end of the second of the levers slidably engages the backside of the pedal pad. Motion transfer means interconnect the opposite end of the second lever with the throttle lever.

BRIEF DESCRIPTION OF THE DRAWINGS

FIG. 1 of the drawings is a side elevational view of an accelerator pedal assembly constructed in accordance with this invention.

FIG. 2 of the drawings is a front view of a portion of the pedal assembly of FIG. 1.

FIG. 3 is a rear elevational view of the pedal portion of the assembly.

DETAILED DESCRIPTION OF A PREFERRED EMBODIMENT

The accelerator pedal assembly includes a first lever 11 and a second lever 13. Each of the levers is pivotally mounted to a mounting bracket 15 by a pin 17. The mounting bracket is secured to the body portion of the automotive vehicle. Each of the brackets has U-shaped cross sections with the second lever resting within the first lever, as shown in FIG. 1 of the drawings. A molded plastic pedal pad 21 is pivotally attached by means of a pin 23 and bracket 25 to the depending end 26 of the first lever. The pin permits the pedal pad to pivot horizontally relative to the first lever. The bracket 25 is integrally formed with the remainder of the pedal pad and provides a pivot axis to the rear of the main portion of the pedal pad about one-fourth or one-third of the distance from the bottom of the pedal pad to its top. The second lever 13 also includes a depending portion whose remote end 27 is slidably engageable with the backside 28 of the pedal pad assembly at a position approximately two-thirds the distance from the bottom of the pedal pad assembly to its top.

Both the first lever 11 and the second lever 13 include portions extending upwardly from the mounting bracket 15. The upwardly extending portion 29 of the first lever is spaced from a tab 31 of bracket 15 during the normal range of lever travel. In the second lever the upwardly extending portion 33 extends past the end of portion 29 and is connected at slot 35 to a motion transfer means or throttle cable 37 which, in turn, is connected to an engine throttle actuation lever (not shown).

A spring (not shown) is included in the throttle cable 37 to place it in tension and bias the pedal assembly toward a normal undepressed position in which the upper portion 29 of the first lever 11 is adjacent but spaced from tab 31 and second lever 13 is in the extreme counterclockwise position (as shown in FIG. 1) permitted before the backside 28 of the pedal pad 21 abuts against the bottom tip of lever 11.

A curved spring 39 acts between the first lever 11 and the second lever 13 and biases the second lever toward an extreme counterclockwise position relative to the first lever, as viewed in FIG. 1 of the drawings.

The extreme depressed or wide open throttle position is achieved when the upper portion 29 of the first lever approaches the lower tab 41 of the mounting bracket and upper end 33 of the second lever 13 is in an extreme rightward position, as viewed in FIG. 1 of the drawings.

It may be seen from the drawings and the foregoing description that the pedal pad 21 is pivotable about pin 23 to adjust to the angle or position of the vehicle operator's foot. It may also be seen that the forward pivotal movement is resiliently resisted by the spring 39 and frictionally resisted by the sliding of lever end 27 against the backside 28 of the pedal pad. In addition, forward pivotal movement of the pedal pad 21 relative to the lever 11 complements the opening movement of the lever 13.

Modifications and alterations will occur to those skilled in the art that are included within the scope of the following claims.

We claim:

1. A pedal assembly suitable for use as an accelerator for an automotive vehicle, said pedal assembly comprising:
   a first lever,
   a second lever,
   mounting means secured to the body of the automotive vehicle or the like,
   said first and second levers being attached to said mounting means to pivot about a common axis,
   said first lever being pivotable relative to said second lever,
   a pedal pad pivotally attached to one end of said first lever, said second lever being connected at one end to motion transfer means to connect the pedal assembly and remote element, said second lever at its other end slidably engaging the pedal pad.

2. A pedal assembly according to claim 1, said pedal pad having a frontside engageable with the foot of the vehicle operator, said other end of the second lever slidably engaging the backside of said pedal pad.

3. A pedal assembly according to claim 1, said first lever depending from said common axis, the portion of said second lever slidably engageable with said pedal pad also depending from said common axis.

4. An accelerator pedal assembly according to claim 1, said first lever being pivotally attached to the lower portion of said pedal pad, said other end of said second lever slidingly engaging a portion of the backside of the pedal pad at a position spaced upwardly from the pivotal attachment of the first lever to the pedal pad.

5. An accelerator pedal assembly according to claim 1, spring means acting between said first lever and said second lever biasing the second lever toward engagement with the backside of said pedal pad.

6. An accelerator pedal assembly according to claim 1, said first and second levers having generally U-shaped cross sections, one of said levers being at least partially nestable within the other.

7. An accelerator pedal assembly for an automotive vehicle comprising:

a mounting bracket secured to the body of the vehicle, a first lever and a second lever attached to said bracket to pivot about a common axis, said first lever being free to pivot relative to said second axis, said first lever having a portion depending from said axis, a pedal pad pivotally attached adjacent the depending end of said first lever, said second lever having a portion depending from said axis, the depending end of said second lever slideably engaging the backside of said pedal pad along a line spaced above the pivotal connection of said pedal pad to the first lever, the backside of said pedal pad being abutable with the end of said first lever to limit the rearward pivotal movement of pedal pad relative to said first lever, said second lever including an upstanding portion from said common axis, motion transfer means connected to said upstanding portion to connect the second lever and a remote element, spring means tending to separate the depending portions of said first and second levers thereby urging said pedal pad toward its rearwardmost position.

* * * * *